Jan. 11, 1966   H. LINDEMANN   3,228,075
METHOD FOR PRODUCING SEAMLESS PIPE
Filed March 19, 1963   3 Sheets-Sheet 2

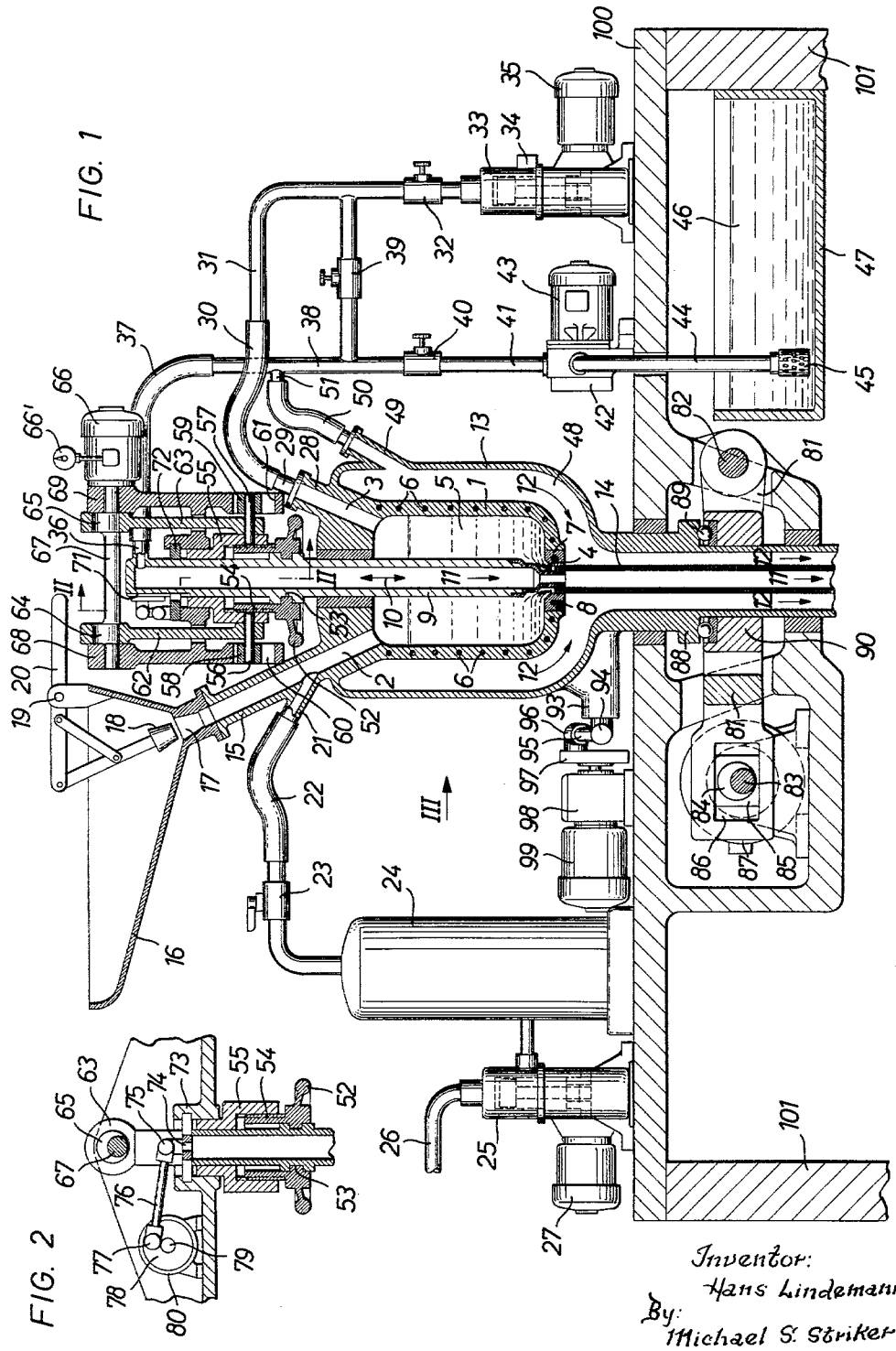

Inventor:
Hans Lindemann
By:
Michael S. Striker
Attorney

Inventor:
Hans Lindemann
By:
Michael S. Striker
Attorney

United States Patent Office 3,228,075
Patented Jan. 11, 1966

3,228,075
METHOD FOR PRODUCING SEAMLESS PIPE
Hans Lindemann, Grossdornberg, near Bielefeld, Germany, assignor to Th. Calow & Co., Bielefeld, Germany
Filed Mar. 19, 1963, Ser. No. 266,424
Claims priority, application Germany, Apr. 28, 1958,
C 16,734
7 Claims. (Cl. 22—200.1)

The present application is a continuation-in-part application of my co-pending application Serial No. 809,044, filed April 27, 1959, and entitled "Method and Apparatus for Producing Seamless Pipe," now Patent No. 3,103,718 issued September 17, 1963.

The present invention relates to an extrusion method, and more particularly to a method for extruding rod-shaped or tubular stock, for example seamless pipes.

The method of the present invention can be applied to any heat deformable material which is liquid at a higher temperature, and solidifies at a lower temperature, and has a condition near the completely solid state in which it can be extruded under pressure. The term "liquid" is used in the present application to define a condition in which the material will flow through an opening.

Metals, particularly steel or brass, and thermoplastic resins are suitable materials for the extrusion method of the present invention.

In accordance with the extrusion method of the prior art, particularly as far as steel is concerned, the steel is liquified in a furnace, and is cast either in surrounding air, or within an inert gas, or in a vacuum. The solidified body will be covered with an oxide layer if cast in air, and it is necessary to remove the oxide layer before an extrusion, if high quality steel is to be obtained. It is very difficult, and expensive, to protect the steel during its entire cooling period by an inert gas, or by a vacuum, and the steel must be protected not only during transport through the extrusion press but also when the steel is heated before the extrusion.

The solidified block may be formed in cold condition, or in hot condition. If the block is to be formed, for example extruded, at atmospheric temperature, a very high pressure is required to place the steel in a viscous condition in which it can be deformed to a desired shape. A thus treated steel has the properties of a cold deformed steel.

If the solidified steel is heated to a selected temperature, for example to 800°, and the heated block is placed in a press and extruded through a nozzle, the steel has the property of forged steel.

It is one object of the present invention to overcome the disadvantages of the extrusion methods of the prior art, and to provide a simple and economical extrusion method resulting in an extruded body of good structural quality.

Another object of the invention is to provide an extrusion method for steel preventing oxidation of the steel and resulting in an extruded body having a bright surface.

Another object of the invention is to provide an extrusion method for making seamless steel pipe requiring no further finishing after the extrusion.

Another object of the invention is to provide an extrusion method in which in accordance with the regulation of pressure and temperature in an extrusion press, the extruded steel body has the structural properties of forged steel, hot deformed steel, or cold deformed steel.

According to the present invention, the material, for example structural steel, is inserted in liquid condition into a pressure-resistant container which is provided with means for heating and cooling the same. The material is then degassed in the container, and thereafter subjected to a high pressure by means of an inert gas, while the temperature is reduced to a selected temperature at which the material has the proper degree of viscosity required for extrusion.

An extrusion method according to the invention comprises the steps of heating a material, such as steel, at a low pressure, for example atmospheric pressure to a high temperature, for example 1400° C., at which the steel is in a liquid state; reducing the temperature of the steel to a selected lower temperature while simultaneously increasing the pressure to maintain the steel in a viscous condition near the completely solid state; adjusting the pressure to a predetermined pressure at which the material is in a viscous condition permitting flow through a nozzle, but which predetermined pressure is selected so that even a small reduction of the predetermined pressure to a sligthly reduced pressure would cause the material to solidify at the selected temperature; and discharging the steel into a space having a low pressure, such as atmospheric pressure so that the discharged steel momentarily solidifies due to the substantial pressure reduction.

By choosing the selected temperature, the properties of the extruded steel body are determined. For example, when the temperature of extrusion is selected to be between 600° C. and 1,000° C., the extruded body will have the properties of forged steel, while when the extrusion temperature is selected to be up to 200° C., the extruded steel bodies will have the properties of a cold deformed steel.

When the material is extruded through a nozzle in which a mandrel is located, a seamless pipe is obtained, and it is possible to manufacture steel pipes in finished condition with a bright surface, and having the desired inner and outer diameters at a rate of production of 200 to 500 meters per minute.

The invention will be best understood from the following description of specific embodiments when read in connection with the accompanying drawings, in which:

FIG. 1 is a side view partly in section, of an apparatus for manufacturing seamless pipes in accordance with the method of the present invention;

FIG. 2 is a fragmentary cross sectional view taken on line II—II in FIG. 1;

Figure 4:
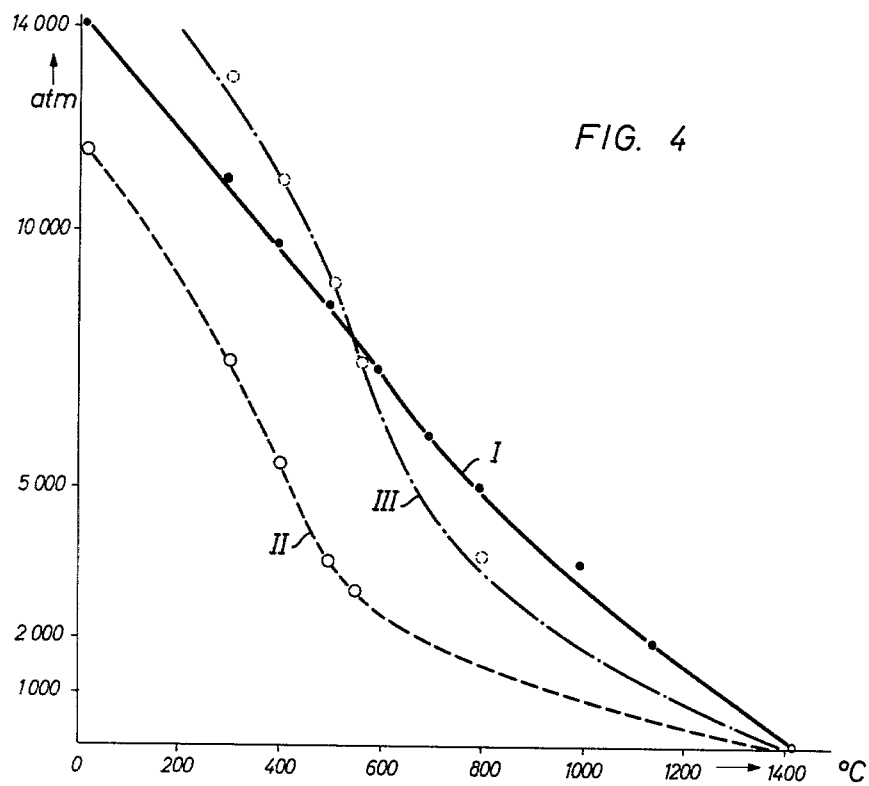
Figure 5:
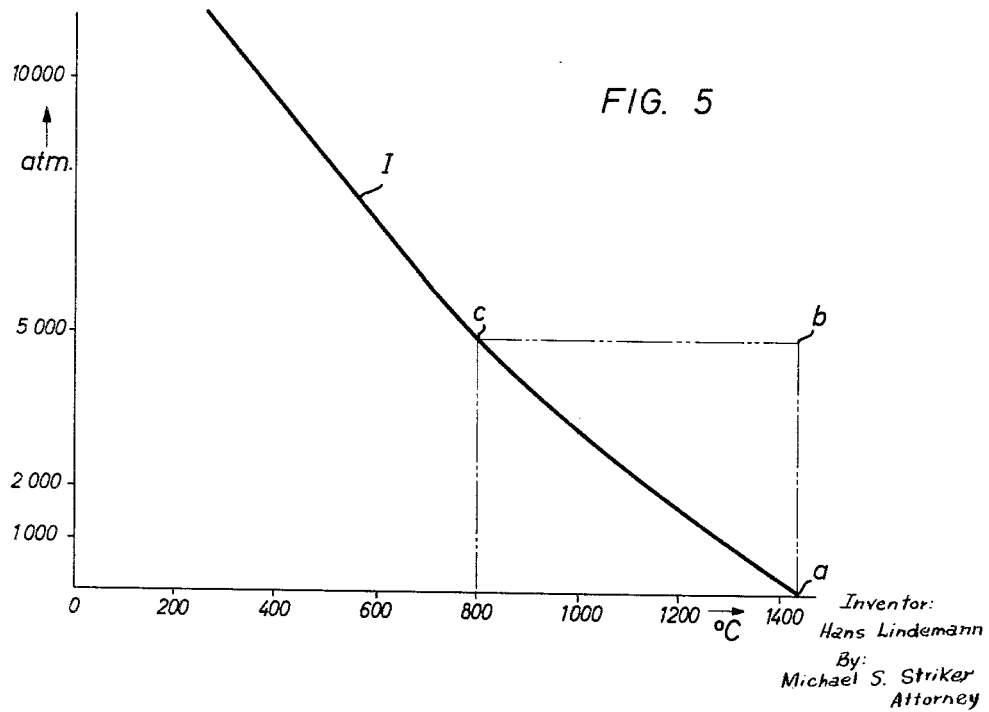

FIG. 4 is a diagram showing three graphs relating to different structural steels and illustrating the temperatures and pressures at which the respective steels will pass from the liquid state to the solid state; and FIG. 5 is a diagram corresponding to FIG. 4 but showing a single graph relating to one steel, and the selection of temperature and pressure during the extrusion method of the present invention.

Referring to the drawings, the particular embodiment of the invention as shown therein has a container 1 for receiving and preparing the material for the extrusion process. This container 1 has three openings 2, 3, and 4. The opening 2 serves as an inlet for supplying the liquid metal 5, as well as the inert gas under pressure into the container 1. The upper opening 3 serves as an outlet through which the container is evacuated and oxidizing gases contained in the liquid metal are extracted. The bottom opening 4 finally serves as an outlet through which the material 5 is extruded to form a seamless pipe.

Inlet opening 2 is connected by one or more suitable valves to the container 1 in which the metal is heated to maintain it in a liquid condition at atmospheric pressure, while opening 3 is connected by valves to a suction pump for evacuating the gases contained in the metal from container 1.

The container is preferably provided with an electric inductive-heating system as indicated by a coil 6, and the extrusion nozzle 7 which surrounds the outlet opening 4 is provided with a separate heating coil 8 and mounted in container 1 so as to be exchangeable.

For opening and closing outlet 4, various means may be used. In the embodiment of the invention as illustrated, outlet 4 may be closed by moving a hollow tubular shaft or mandrel 9 which has a plug portion thereon in the downward direction as indicated by the arrow 10. This tubular mandrel 9 and the container 1 are cooled either by water or by an inert gas which flows in the direction indicated by the arrows 11 and 12. The cooling water or gas which is passed through the hollow mandrel 9, as well as the gas flowing between container 1 and the outer wall 13 emerge in the same direction in which the seamless pipe 14 is extruded from the container when the annular aperture between the hollow mandrel 9 and extrusion nozzle 7 is opened.

At the beginning of the operation, outlet 4 is tightly closed and container 1 is completely evacuated. The material, for example steel, or another metal, or a thermoplastic resin, is filled in liquid condition through inlet 2 into container 1, thereby omitting the step of reheating a solidified material according to conventional hot extrusion methods. The oxidizing gases are now extracted from the liquid material and removed from the container through outlet 3. Thereupon, an inert gas is fed under pressure into the container. The container is then cooled, and the pressure therein maintained or regulated so that the material thereon, for example, steel, has a desired and selected temperature and pressure while still in a liquid condition. The hollow mandrel 9 and container 1 are preferably subjected to longitudinal and rotary vibrations in order to agitate the liquid steel and to effect a thorough mixture thereof. When a desired viscous condition intermediate the free-flowing liquid state and the completely solid state is attained by regulation of the pressure in accordance with the temperature of the liquid metal, mandrel 9 is shifted to a position in which the steel will start to flow through outlet 4, unless it is too viscous. The container is heated until the steel becomes sufficiently fluid to pass through outlet 4 between nozzle 7 and mandrel end portion 9, and to be discharged into a low pressure space which may be under atmospheric pressure. The heating is carried out automatically so that the extrusion speed will remain constant.

The method of the present invention will be best understood with reference to FIGS. 4 and 5. FIG. 4 is a diagram illustrating in the form of graphs the properties of three different structural steels at different temperatures measured in degrees centigrade and at different pressures measured in atmospheres. Graph I represents a structural steel having a tensile strength between 60 kilograms per square millimeter and 70 kilograms per square millimeter. The breaking elongation is at least 17% and the carbon content about 0.45%. This steel is also known as St. 60.

Graph II shown in broken lines represents the properties of another structural steel having a tensile strength between 35 kilograms per square millimeter and 42 kilograms per square millimeter, a breaking elongation of at least 30%, and a carbon content of approximately 0.12%. This steel is known as St. 35. The third graph III illustrated in dash and dot lines represents the properties of a steel alloy containing chromium, silicon, and molybdenum.

The black dots on graph I, the circles on graph II, and the dotted circles on graph III indicate the values obtained by tests.

The graphs illustrate the temperatures and pressures at which the respective steel will pass from the liquid state to the solid state. In the region directly above the respective graphs, the respective steel will be in a viscous condition intermediate the free flowing liquid state and the completely solid state.

FIG. 5 shows only graph I representing the behavior of steel St. 60 at different temperatures and pressures.

In accordance with the present invention, steel is inserted into the container in liquid condition, and consequently is at a temperature of about 1450°, since at this temperature steel will be liquid at atmospheric pressure which prevails since the container is open. If the steel would be permitted to cool off while the container is open, it will solidify at a temperature of approximately 1400°, as will be apparent from an interpretation of the diagram of FIG. 5.

However, the container is closed after the hot liquid steel has been filled into the same, and the pressure in the container is increased by introducing an inert gas under pressure into the container. The steel is now permitted to cool off.

If the pressure would be maintained at only 1000 atm. when the steel has cooled off to, for example, 1200° C., the material would solidify since the corresponding point located below graph I. However, in accordance with the present invention, as the steel cools off, the pressure in the container is increased to such an extent that the steel is maintained in liquid condition.

This "liquid" condition is a condition of the steel in which it will flow through outlet 4 when the same is opened.

Assuming that it is intended to extrude the steel at a temperature of 800° C. which will result in an extruded solidified steel having the properties of forged steel, the point $c$ can be found on the graph where the ordinate of 800 intersects with the graph, and such ordinate indicates that at 5000 atm. pressure, the steel will pass from the liquid state to the solid state, and be in a viscous condition intermediate the free-flowing state and the completely solid state. This condition is favorable for an extrusion, and can be obtained in two ways.

If the pressure is increased to 5000 atm. directly after the container is closed, and while the steel is still liquid at a temperature of 1450° C., the steel will be completely liquid as indicated by the point $b$. The pressure may now be maintained at 5000 atm. while the steel is permitted to cool off until the point $c$ is reached. At this moment, the steel will be in a viscous condition, and even a very slight reduction of the pressure would cause the steel to solidify. If, while the steel cools off, the pressure is regulated to be gradually increased in accordance with the graph I so that the steel is at any time in a viscous condition suitable for extrusion since it will flow through an extrusion nozzle under the prevailing pressure, the varying condition of the steel would be indicated by the portion of the graph between the point $a$ and the point $c$. For example, when the steel has a temperature of 1200°, the pressure is regulated to about 1600 atm., and when the temperature of the steel is about 1160°, the pressure is regulated to be 2000 atm.

If the pressure would be lower than indicated by the graph at any time during the cooling off of the steel, the steel would solidify in the container even if the pressure were only slightly reduced and be so hard that it would not flow out of an open extrusion nozzle under the prevailing pressure. It is, of course, possible to regulate the speed of cooling off by heating the container, but in any event, the pressure and temperature of the steel at any moment must result in a condition which could be graphically indicated within the area $a$, $b$, $c$ in FIG. 5, which is a yielding extrusion permitting viscous condition until a selected extrusion temperature, for example 800°, is reached.

As explained above, even a slight reduction of the pressure at the point $c$ would result in the immediate solidification of the steel without any further cooling off.

Consequently, when the steel is discharged at this temperature and pressure through outlet 4 into a low pressure space, which for example, may have atmospheric pressure, the extruded steel will solidify very rapidly since the pressure rapidly drops from 5000 atm. to atmospheric pressure so that complete solidifying of the steel takes place while the same is still at temperature of 800° directly after leaving the extrusion nozzle. The temperature and pressure conditions prevailing at this moment are indicated by the ordinate of the point c on the graph which means that the temperature of the extruded body is still 800°, while the extruded body is completely solid due to the very great reduction of pressure.

In the extrusion methods of the prior art, the liquid steel produced at the steel mill is cast and solidified, and when such steel is to be used for an extrusion process, the steel is heated from atmospheric temperature to the desired extrusion temperature, for example 800°. This would correspond to a movement along the abscissa axis in FIG. 5 to the point 800° C., whereupon the pressure is increased until the point c is reached, whereupon extrusion takes place. In accordance with the prior art, it is also possible to insert the cast block into the extrusion press after the block has cooled off for 1500° to 800°, and in this event the cooling off period of the metal will be indicated by the diagram of FIG. 5 by the abscissa axis between value of 1500° and 800°, moving from the right to the left. In either method, according to the prior art, the steel is not held in condition permitting flow through the extrusion nozzle by correspondingly increasing the pressure during the cooling off period.

Steel having the properties of hot deformed steel can be obtained in accordance with the present invention by cooling the steel to a temperature between 200° and 600° C. while maintaining the pressure so high that the steel will be at all times in a condition indicated in the diagram of FIG. 5 by graph I, or above the graph. For example, if the extrusion is to take place at 600° C., the pressure will be about 5000 atm. when the steel has a temperature of 800° C., and will be about 7000 atm. when the steel has cooled off to a temperature of 600°. In contrast thereto, in accordance with the prior art, the steel would be heated to a temperature of 600°, or cooled to a temperature of 600° at atmospheric pressure, and then placed in an extrusion press to be extruded at a pressure of over 7000 atm.

If in accordance with the present invention a steel having the properties of cold deformed steel is to be obtained, the steel is also filled in liquid condition at atmospheric pressure into the container, and the pressure is increased during the cooling off period, and is at any moment maintained at such height that the steel does not become solid during the cooling off period until the temperature has dropped to 200°, whereupon the steel is discharged from the container and extruded. As explained above, the steel which is in a viscous condition intermediate the completely fluid and the completely solid state will momentarily solidify upon extrusion due to the extremely great pressure difference between the container and the extrusion space.

Due to the fact that in accordance with the present invention the material is first in liquid condition, and is then cooled off to the proper extrusion condition, an extrusion press of simple construction can be used which permits it to carry out the extrusion operations under the protection of an inert gas, thereby completely avoiding oxidation of the material during its preliminary solidification before insertion into the extrusion press.

A particularly economical process is obtained if the liquid steel produced by the steel mill is directly filled into the extrusion container, and then extruded according to the method of the present invention.

As explained above, the steel is free-flowing and completely liquid in a region above the graph I, and attains a viscous condition intermediate the completely liquid and the completely solid state in the region indicated by graph I. Consequently, it is possible to determine the desired relationship between the gradually reduced temperature and the increased pressure during the cooling off period, by measuring the viscosity of the metal.

This is preferably done by oscillating mandrel 9, and by measuring the frictional resistance encountered by mandrel 9 in the liquid metal. The resistance encountered by the oscillating mandrel in the metal is a measure of the viscosity of the metal, and consequently can be used for determining whether or not the steel remains in the proper liquid condition during the cooling off period.

If the seamless pipe, or other extruded body, to be produced, is to be made shorter than the length of the extruded body obtained with the amount of material in container 1, the extrusion nozzle 7 is momentarily heated by the heating coil 8, so that the material will be liquified in the nozzle, and the solid extruded pipe will tear off at the nozzle. The extrusion nozzle is then closed to prevent the liquid material from flowing out of the container. Of course, the extrusion of metal from the container may also be interrupted by simply closing the extrusion nozzle.

Due to the fact that the steel is maintained in liquid condition until being extruded, the texture and crystal structure of the extruded body is of very high quality, and the extruded article has a bright surface free of any oxide layer.

Although the means for supplying the liquid metal and the inert gas, or the means for reciprocating the container and the mandrel and the specific manner of arranging the various containers relative to each other may be in accordance with many different designs, a few suitable embodiments of the invention will now be described with respect to those elements illustrated in the drawings which have as yet not been particularly mentioned.

The inlet 2 of container 1 is connected to an inlet pipe 15 which carries an open funnel-like container 16 into which the liquid metal such as structural steel is poured. The opening 17 of container 16 is closed by a plug 18 which is operated by a lever 20 pivotably mounted at 19. Inlet pipe 15 branches off into a pipe 21 which is connected by a flexible hose 22 and a control valve 23 to a surge tank 24 which is supplied by a reciprocating pump 25 driven by a motor 27 with an inert gas drawn from a suitable source of supply through a pipe 26.

The outlet 3 is connected by a pipe flange 28 to a hose connection 29 to which a flexible hose 30 is secured which is connected through a pipe 31 and a control valve 32 to a reciprocating pump 33 driven by a motor 35 and operating as a suction pump to evacuate the container 1, particularly to remove the oxidizing gases of the liquid metal.

The inside of the hollow mandrel 9 communicates through a hose coupling 36 and a flexible hose 37 with a pipe 38 which may be connected, on the one hand by a control valve 39 to pipe 31 and, on the other hand by a control valve 40 to a pipe 41 which is connected to the pressure side of a rotary pump 42 driven by a motor 43. The suction side of pump 42 is connected to a pipe 44 with a suction strainer 45 thereon which is immersed in a cooling fluid 46 in a container 47. The annular chamber 48 formed between the container 1 and the outer wall 13 is likewise connected to pipe 38 through a pipe flange 49, a flexible hose 50, and a hose connection 51.

If the cooling fluid is to be passed through the hollow mandrel 9, control valve 39 is closed and control valve 40 is opened, whereupon motor 43 is switched on. Since chamber 48 around container 1 communicates with pipe 38 through the flexible hose 50, the cooling fluid, for example, water, flows through chamber 48. If chamber 48 and the inside of mandrel 9 is to be supplied with an inert gas in order to protect the extruded pipe from scaling or oxidation, both control valves 32 and 40 are closed. After the liquid metal in container 1 has been degassed while control valve 32 is still open and control valve 39 closed, the inert gas passes from container 1 through the opening 3, hose 30, pipe 31 and the opened control valve 39 and hose 37 to the inside of mandrel 9 and also through hose 50 into chamber 48. The pressure of the gas in surge tank 24 and the control valve 39 should then be regulated so that the pressure in container 1 will still be of a sufficient strength to force the viscous material 5 through the extrusion nozzle 7.

Figure 3:
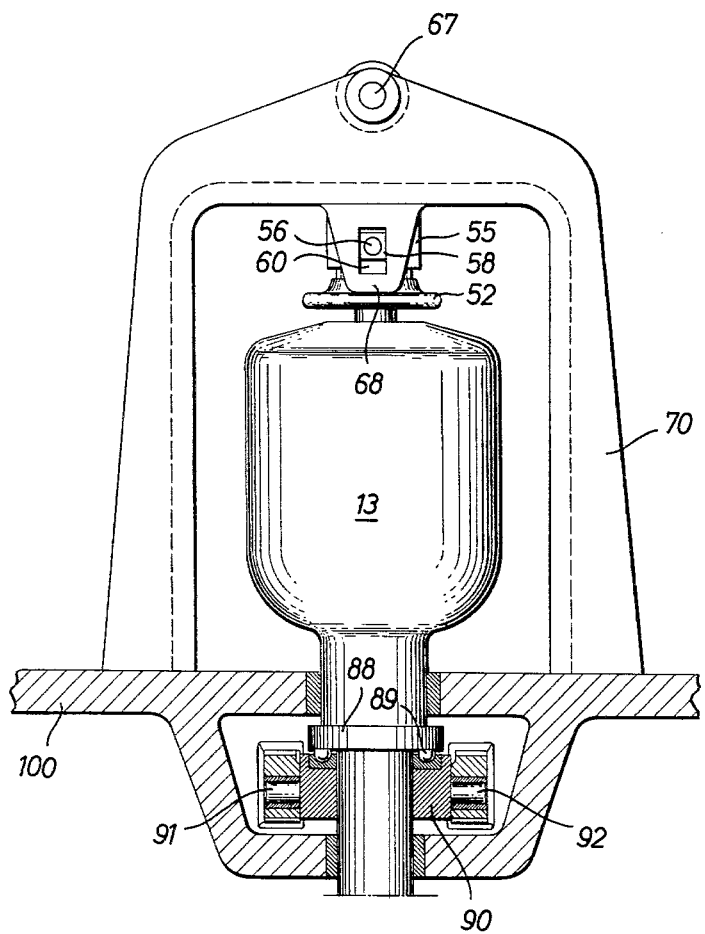
FIG. 3 is an elevation, partly in cross section, of a part of the apparatus as viewed in the direction of the arrow III in FIG. 1.

Above the container 1, the hollow shaft of mandrel 9 carries a handwheel 52 which engages into an annular groove 53 in the outer surface of this shaft so as to be rotatable thereon, but nonslidable in its axial direction. This handwheel 52 has a threaded portion 54 thereon which engages into a threaded bushing 55. This bushing 55 is slidably mounted on the mandrel shaft 9 to guide the same and is, in turn, guided within a bushing 73 which is integrally secured to and connects a pair of brackets 68 and 69 on the upper part of a frame 70. Bushing 55 carries a pair of trunnions 56 and 57, each of which carries a slide member 58 or 59, respectively. As illustrated in FIGURE 3, slide members 58 and 59 are slidable in elongated apertures 60 and 61 in brackets 68 and 69. Between brackets 68 and 69 and bushing 55, trunnions 56 and 57 are rotatably mounted on the lower ends of a pair of connecting rods 62 and 63, the upper ends of which are rotatably connected to a pair of eccentrics 64 and 65 which are rigidly secured to a shaft 67. This shaft 67 is rotatably mounted within frame 70 and driven by a motor 66 which is also mounted on frame 70. Since the speed of rotation of shaft 67 is dependent upon the viscosity of the material 5 in container 1 and the friction encountered by mandrel 9 therein, the readings on a speedometer 66' provided on motor 66 will serve as an indication of the degree of the viscosity of fluidity of the material.

When shaft 67 is not being driven by motor 66, mandrel 9 may be raised or lowered by turning of the handwheel 52 for the purpose of opening or closing the extrusion nozzle 7. In the embodiment of the invention according to FIGURE 1, handwheel 52 is shown as being turned to a position in which mandrel 9 is raised from the extrusion nozzle 7 so that the liquid material 5 can be extruded through nozzle 7 in the downward direction. If shaft 67 is then rotated by motor 66, mandrel 9 will be reciprocated in a vertical direction.

It is advisable to move the mandrel 9 not only upwardly and downwardly, but also to give it torsional vibrations. This may be effected by reciprocating the mandrel about its longitudinal axis. The upper end of mandrel 9 is for this purpose provided with a groove 71 which extends parallel to the axis of the mandrel. An annular disk 72 which is mounted within the bushing 73 on brackets 68 and 69 engages with an inner tooth into groove 71 and is, in turn, connected by a trunnion 74 and a ball-and-socket joint 75 to a connecting rod 76 which is eccentrically mounted by another ball-and-socket joint 77 on a disk 78 which is secured to the shaft 79 of a motor 80. Thus, mandrel 9 may be reciprocated in the vertical direction by motor 66 and in a rotary direction about its longitudinal axis by motor 80.

In a similar manner it is also possible to reciprocate the container 1 and the outer wall 13 with the various parts thereon both in the vertical and rotary directions. In the particular embodiment of the invention as illustrated in the drawings, the vertical reciprocation of these parts is effected by a bifurcated rocker arm 81 which is pivotable upwardly and downwardly about a trunnion 82 by means of an eccentric 84 on a shaft 83. The eccentric 84 is rotatably mounted in a slide member 85 which is slidable laterally in an elongated aperture 86 in rocker arm 81. Shaft 83 may be driven by a motor 87. On its lower tubular part, the outer wall of chamber 48 is provided with a flange 88 which rests on a thrust bearing 89 for supporting the entire container 1 including chamber 48. This thrust bearing 89 is, in turn, supported by an annular part 90 which, as shown in FIGURE 3, is pivotably mounted on trunnions 91 and 92 between the two arms of the bifurcated rocker arm 81.

For reciprocating the container 1 including the chamber 48 about its vertical axis, the outer wall 13 of the latter is provided with a lateral extension 93 which is connected by a ball-and-socket joint 94 on one end of a rod 95 and another ball-and-socket joint 96 on the other end to an eccentric on a disk 97 which is rotatably mounted in a bearing 98 and driven by a motor 99.

All of the elements as above described are supported by a frame 100 which is mounted on a suitable foundation 101.

It will be understood that each of the elements described above or two or more together, may also find a useful application in other types of extrusion methods differing from the types described above.

While the invention has been illustrated and described as embodied in an extrusion method in which a material is maintained in a liquid state until it is extruded at a selected temperature, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. An extrusion method comprising, in combination, the steps of heating a material at low pressure to a high temperature at which the material is in the liquid state, said material being of such a nature as to solidify at said low pressure and at a lower temperature; reducing the temperature of the material in a closed container to a selected lower temperature while simultaneously increasing the pressure in the container; adjusting the pressure in the container to a predetermined pressure at which the material is adapted to flow at said selected temperature, but which predetermined pressure is selected so that even a small reduction of said predetermined pressure to a slightly reduced pressure would cause the material to solidify at said selected temperature; and discharging the material at said predetermined pressure and selected temperature from said container through an extrusion nozzle into a space having a pressure substantially lower than said slightly reduced pressure so that the discharged material momentarily solidifies due to the substantial pressure reduction.

2. An extrusion method comprising, in combination, the steps of heating a steel at atmospheric pressure to a high temperature at which the material is in the liquid state; reducing the temperature of the material in a closed container to a selected lower temperature while simultaneously increasing the pressure in the container; adjusting the pressure in the container to a predetermined pressure at which the material is adapted to flow at said selected temperature, but which predetermined pressure is selected so that even a small reduction of said predetermined pressure to a slightly reduced pressure would cause the material to solidify at said selected temperature; and discharging the material at said predetermined pressure and selected temperature from said container through an extrusion nozzle into a space having atmospheric pressure so that the discharged steel momentarily solidifies due to the substantial pressure reduction.

3. An extrusion method comprising, in combination, the steps of heating a steel at atmospheric pressure to a high temperature at which the material is in the liquid state; reducing the temperature of the material in a closed container to a selected lower temperature within a range from 600° centigrade to 1000° centigrade while simultaneously increasing the pressure in the container; adjusting the pressure in the container to a predetermined pressure at which the material is adapted to flow at said selected temperature, but which predetermined pressure is selected so that even a small reduction of said predetermined pressure to a slightly reduced pressure would cause the material to solidify at said selected temperature; and discharging the material at said predetermined pressure and selected temperature from said container through an extrusion nozzle into a space having atmoshperic pressure so that the discharged steel momentarily solidifies due to the substantial pressure reduction and has the properties of forged steel.

4. An extrusion method comprising, in combination, the steps of heating a steel at atmospheric pressure to a high temperature at which the material is in the liquid state; reducing the temperature of the material in a closed container to a selected lower temperature within a range from 200° centigrade to 600° centigrade while simultaneously increasing the pressure in the container; adjusting the pressure in the container to a predetermined pressure at which the material is adapted to flow at said selected temperature, but which predetermined pressure is selected so that even a small reduction of said predetermined pressure to a slightly reduced pressure would cause the material to solidify at said selected temperature; and discharging the material at said predetermined pressure and selected temperature from said container through an extrusion nozzle into a space having atmospheric pressure so that the discharged steel momentarily solidifies due to the substantial pressure reduction and has the properties of warm deformed steel.

5. An extrusion method comprising, in combination, the steps of heating a steel at atmospheric pressure to a high temperature at which the material is in the liquid state; reducing the temperature of the material in a closed container to a selected lower temperature up to 200° centigrade while simultaneously increasing the pressure in the container; adjusting the pressure in the container to a predetermined pressure at which the material is adapted to flow at said selected temperature, but which predetermined pressure is selected so that even a small reduction of said predetermined pressure to a slightly reduced pressure would cause the material to solidify at said selected temperature; and discharging the material at said predetermined pressure and selected temperature from said container through an extrusion nozzle into a space having atmospheric pressure so that the discharged steel momentarily solidifies due to the substantial pressure reduction and has the properties of cold deformed steel.

6. An extrusion method comprising, in combination, the steps of heating a steel at atmospheric pressure to a high temperature at which the material is in the liquid state; reducing the temperature of the material in a closed container to a selected lower temperature while simultaneously pressing an inert gas into the container to increase the pressure in the container to maintain the material in a viscous condition near the completely solid state while maintaining pressure and temperature in such a relationship that even a small reduction of the pressure at any time would cause the metal to solidify at the temperature prevailing at that time so that when said selected temperature is reached, the pressure in the container is adjusted to a predetermined pressure at which the material is in a viscous condition adapted to flow, but which predetermined pressure is selected so that even a small reduction of said predetermined pressure to a slightly reduced pressure would cause the material to solidify at said selected temperature; and discharging the material at said predetermined pressure and selected temperature from said container through an extrusion nozzle into a space having atmospheric pressure so that the discharged steel momentarily solidifies due to the substantial pressure reduction.

7. An extrusion method comprising, in combination, the steps of heating a steel at low pressure to a high temperature at which the material is in the liquid state; reducing the temperature of the material in a closed container to a selected lower temperature while simultaneously increasing the pressure in the container; adjusting the pressure in the container to a predetermined pressure at which the material is in a viscous condition near the completely solid state and adapted to flow at said selected temperature, but which predetermined pressure is selected so that even a small reduction of said predetermined pressure to a slightly reduced pressure would cause the material to solidify at said selected temperature; measuring the viscosity of the steel while adjusting the pressure until a desired viscous condition suitable for extrusion through an extrusion nozzle is obtained; and discharging the material at said predetermined pressure and selected temperature from said container into a space having a pressure substantially lower than said silghtly reduced pressure so that the discharged steel momentarily solidifies due to the substantial pressure reduction.

References Cited by the Examiner

UNITED STATES PATENTS

| 770,130 | 9/1904 | Trotz | 22—72 |
| 777,561 | 12/1904 | Stravs et al. | 22—57.2 |
| 2,225,373 | 12/1940 | Goss | 22—200.1 |
| 2,569,150 | 9/1951 | Brennan | 22—57.2 |
| 2,581,550 | 1/1952 | Misfeldt | 22—68 |
| 2,858,586 | 11/1958 | Brennan | 22—200.1 |
| 2,907,082 | 10/1959 | Pond | 22—57.2 |

OTHER REFERENCES

Fowle, Smithsonian Physical Tables, page 200, published 1923.

MARCUS U. LYONS, *Primary Examiner.*

MICHAEL V. BRINDISI, WILLIAM J. STEPHENSON, *Examiners.*